United States Patent
Griffin et al.

(10) Patent No.: US 9,835,032 B2
(45) Date of Patent: Dec. 5, 2017

(54) DISK LUG COOLING FLOW TRENCHES

(71) Applicant: United Technologies Corporation, Hartford, CT (US)

(72) Inventors: David Richard Griffin, Tolland, CT (US); Zachary Mott, Glastonbury, CT (US); Christopher Corcoran, Manchester, CT (US); Ross Wilson, South Glastonbury, CT (US); Jason D Himes, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 268 days.

(21) Appl. No.: 14/727,194

(22) Filed: Jun. 1, 2015

(65) Prior Publication Data

US 2016/0348510 A1 Dec. 1, 2016

(51) Int. Cl.
*F01D 5/08* (2006.01)
*F01D 5/30* (2006.01)

(52) U.S. Cl.
CPC ........... *F01D 5/082* (2013.01); *F01D 5/3007* (2013.01); *F01D 5/081* (2013.01); *F05D 2220/32* (2013.01); *F05D 2230/12* (2013.01); *F05D 2230/30* (2013.01); *F05D 2240/81* (2013.01); *F05D 2250/294* (2013.01); *F05D 2260/20* (2013.01); *F05D 2300/177* (2013.01); *Y02T 50/676* (2013.01)

(58) Field of Classification Search
CPC ......... F01D 5/082; F01D 5/3007; F01D 5/081
See application file for complete search history.

(56) References Cited

U.S. PATENT DOCUMENTS

| 5,630,703 A * | 5/1997 | Hendley | F01D 5/081 416/220 R |
| 6,071,075 A * | 6/2000 | Tomita | F01D 5/187 416/97 A |
| 2005/0201857 A1* | 9/2005 | Ferra | F01D 5/082 415/115 |

FOREIGN PATENT DOCUMENTS

| EP | 1088963 | 4/2001 | |
| EP | 1574670 | 9/2005 | |
| EP | 2436879 | 4/2012 | |
| WO | 2014033408 | 3/2014 | |
| WO | 2015073112 | 5/2015 | |
| WO | WO 2015073112 A2 * | 5/2015 | F01D 5/081 |

OTHER PUBLICATIONS

Extended European Search Report dated Sep. 30, 2016 in European Application No. 16163188.2.

* cited by examiner

*Primary Examiner* — Eldon Brockman
(74) *Attorney, Agent, or Firm* — Snell & Wilmer L.L.P.

(57) ABSTRACT

A rotor disk is provided. The rotor disk may comprise a disk lug and a trench. The disk lug may be fixed to a distal surface of the rotor disk. The trench may be disposed on a surface of the disk lug. The trench may extend radially inwards from a distal surface of the disk lug. The trench may be configured to at least partially define a flow path by which cooling air may reach a distal surface of the disk lug in order to provide disk lug cooling.

11 Claims, 4 Drawing Sheets

DISK LUG COOLING FLOW TRENCHES

GOVERNMENT LICENSE RIGHTS

This disclosure was made with government support under FA 8650-09-D-2923-0021 awarded by the United States Air Force. The government has certain rights in the disclosure.

FIELD

The present disclosure relates to gas turbine engines, and more specifically, to a turbine blade rotor disk with disk lug trenches.

BACKGROUND

Gas turbine engines generally include a compressor to pressurize inflowing air, a combustor to burn a fuel in the presence of the pressurized air, and a turbine to extract energy from the resulting combustion gases. The turbine may include multiple rotatable turbine blade arrays separated by multiple stationary vane arrays. The turbine blades are coupled to a rotor disk assembly which is configured to rotate about an engine axis. The turbine blades and vanes, as well as the rotor disk assembly, are subject to relatively high temperatures. Accordingly, compressed air from the compressor section is channeled to the turbine section where it can be directed through the rotor disk assembly and cool various components of the rotor disk assembly.

SUMMARY

A rotor disk is provided. The rotor disk may comprise a disk lug and a trench. The disk lug may be fixed to a distal surface of the rotor disk. The trench may be disposed on a surface of the disk lug, wherein the trench extends radially inwards from a distal surface of the disk lug. The trench may be configured to at least partially define a flow path by which air may reach a distal surface of the disk lug. The trench may be located on a forward side of the rotor disk.

A rotor disk assembly is provided. The rotor disk assembly may comprise a rotor disk, a retainer plate, a cover plate, and a shield plate. The rotor disk may comprise a disk lug and a trench, wherein the trench is disposed on a surface of the disk lug, wherein the trench extends radially inwards from a distal surface of the disk lug, wherein the trench is configured to at least partially define a flow path by which air may reach the distal surface of the disk lug. The disk lug may be fixed to a distal surface of the rotor disk. The flow path may be partially defined by at least a portion of the aft surface of the retainer plate. The cover plate may be coupled to the rotor disk, wherein the flow path may be partially defined by at least a portion of the aft surface of the cover plate. The blade platform may be coupled to the cover plate via the retainer plate. The shield plate may be coupled between the distal surface of the disk lug and a proximal surface of the blade platform, wherein the flow path may be partially defined by the distal surface of the disk lug and the proximal surface of the blade platform.

A gas turbine engine is provided. The gas turbine engine may comprise a rotor disk assembly. The rotor disk assembly may comprise a rotor disk, a retainer plate, a cover plate, and a shield plate. The rotor disk may comprise a disk lug and a trench, wherein the trench is disposed on a surface of the disk lug, wherein the trench extends radially inwards from a distal surface of the disk lug, wherein the trench is configured to at least partially define a flow path by which air may reach a distal surface of the disk lug. The disk lug may be fixed to a distal surface of the rotor disk. The cover plate may be coupled to the rotor disk. The blade platform may be coupled to the cover plate via the retainer plate. The shield plate may be coupled to the distal surface of the disk lug. The trench may be located on a forward side of the rotor disk.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
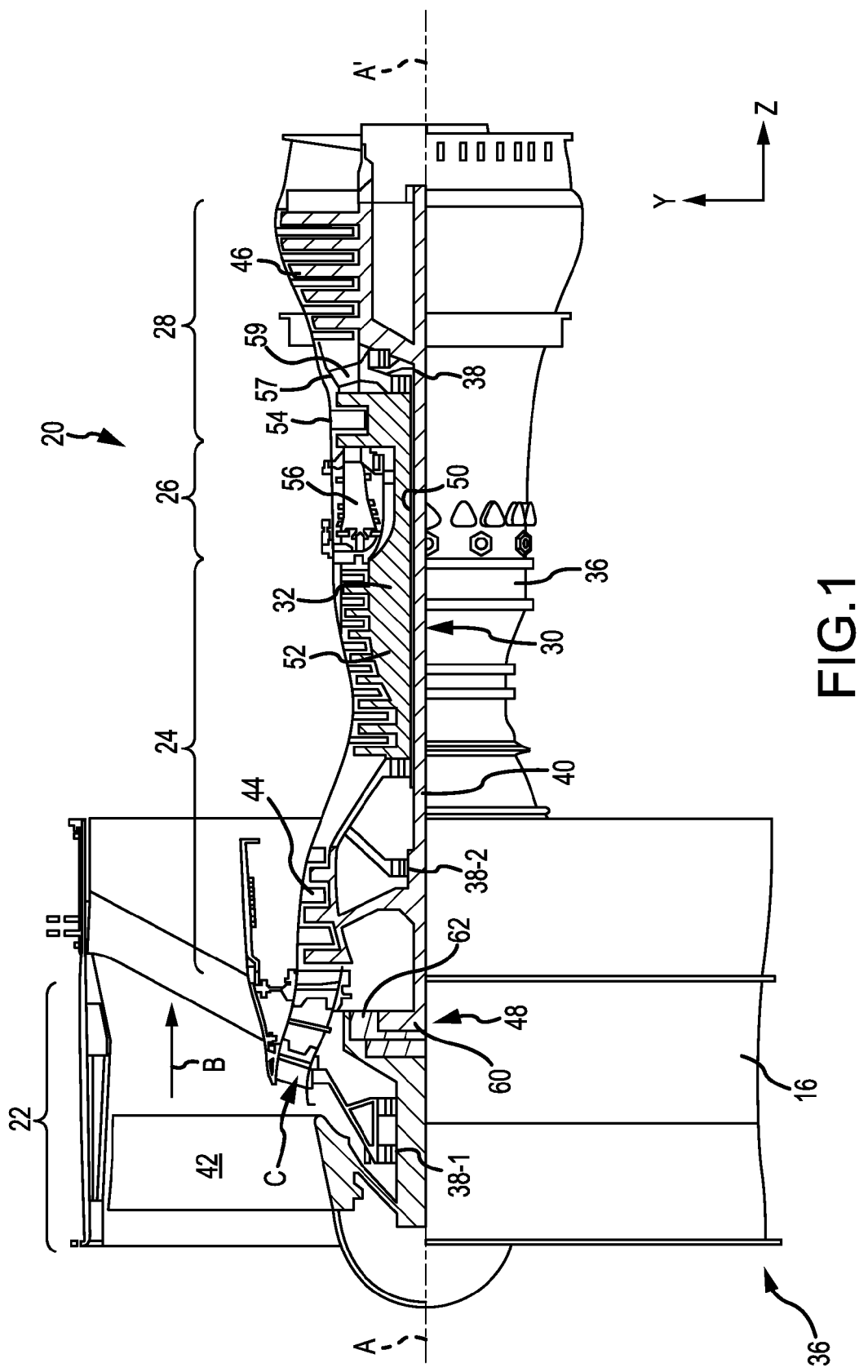
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 1). It should be understood that various bearing systems 38 at various locations may alternatively or additionally be provided including, for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation of turbofan engines are designed for higher efficiency and use higher pressure ratios in high pressure compressor 52 and higher temperatures in high pressure compressor 52 and high pressure turbine 54 than are conventionally experienced. These higher operating temperatures and pressure ratios create operating environments that cause thermal loads that are higher than the thermal loads conventionally experienced, which may shorten the operational life of current components.

Figure 2:
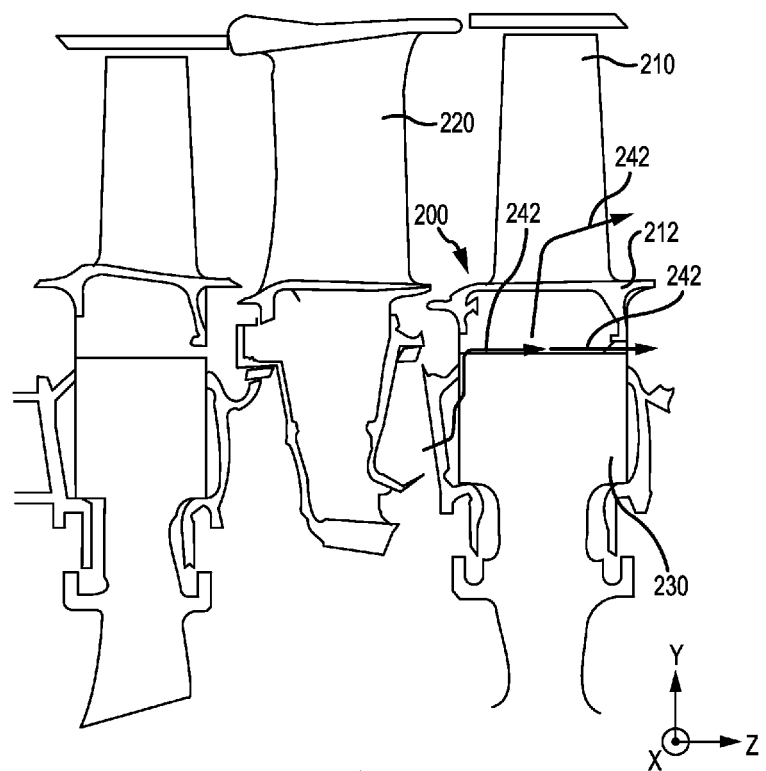
FIG. 2 illustrates a cross-section view of a turbine section of a gas turbine engine, in accordance with various embodiments.

With reference now to FIGS. 1 and 2, high pressure turbine section 54 may include a plurality of airfoils including a plurality of vanes, such as vane 220, and a plurality of blades, such as blade 210. The plurality of vanes and blades may be arranged circumferentially about an engine axis A-A' to define a flow path boundary for a core flow path C. Rotor disk assembly 200 may comprise blade 210, blade platform 212, and rotor disk 230. Blade 210 may be fixed to blade platform 212. Blade 210 may be coupled to rotor disk 230 via blade platform 212. Rotor disk 230 may comprise a high pressure turbine (HPT) rotor disk. Rotor disk 230 may comprise a high pressure compressor (HPC) rotor disk. Rotor disk assembly 200 may experience extremely high temperatures from exhaust air in flow path C. Accordingly, cooling air from various engine components may help decrease operating temperatures of rotor disk assembly 200 and, in particular, of the outside surface of rotor disk 230. Rotor disk 230 may receive air 242 from compressor section 24 and/or other components of gas turbine engine 20. In various embodiments, air 242 may comprise cooling air, for example, engine bypass air.

Figure 3A:
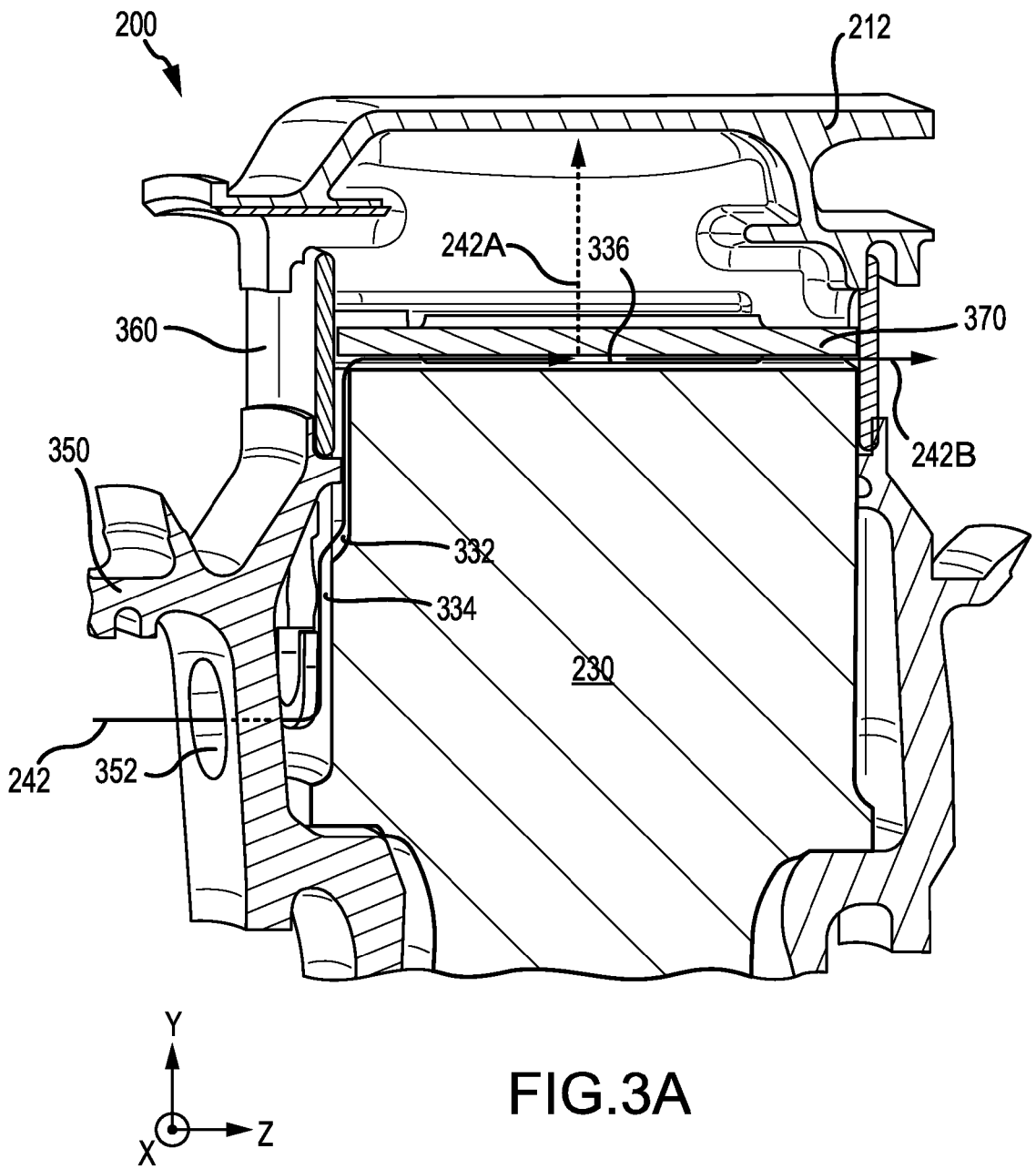
FIG. 3A illustrates a partial cross-section view of a rotor disk assembly, in accordance with various embodiments.

With respect to FIG. 3A, elements with like element numbering as depicted in FIG. 2 are intended to be the same and will not be repeated for the sake of clarity.

In various embodiments and with reference now to FIG. 3A, rotor disk assembly 200 may further comprise cover plate 350, retainer plate 360, and shield plate 370. Cover plate 350 may be coupled to rotor disk 230. In various embodiments, cover plate 350 may be coupled to the forward side of rotor disk 230. Aperture 352 may be disposed in cover plate 350. Retainer plate 360 may be coupled to cover plate 350. Retainer plate 360 may be coupled to blade platform 212. Retainer plate 360 may comprise a segmented annulus. Accordingly, retainer plate 360 may comprise an annulus separated into various segments. Shield plate 370 may be located between rotor disk 230 and blade platform 212. Shield plate 370 may be referred to as a dead rim shield. Rotor disk 230 may include a plurality of disk lugs, including disk lug 334. Disk lug 334 may be fixed to the distal surface of rotor disk 230. Disk lug 334 may be integral to rotor disk 230. Disk lug 334 may be configured to couple blade platform 212 to rotor disk 230. Trench 332 may be disposed on the surface of rotor disk 230. Trench 332 may comprise a groove or channel. Trench 332 may be disposed on the forward surface of rotor disk 230. Trench 332 may be disposed on disk lug 334. Trench 332 may extend radially inwards from the distal surface 336 of disk lug 334. Trench 332 may be configured to allow cooling air to decrease the temperature of the distal surface 336 of disk lug 334. Accordingly, trench 332 may provide thermal cooling to the distal surface 336 of disk lug 334. In various embodiments, rotor disk 230 may comprise an annulus or disk. Accordingly, FIG. 3A is a cross-section view of rotor disk 230.

With reference now to FIG. 2 and FIG. 3A, trench 332 may be configured to at least partially define a flow path by which air may reach distal surface 336 of disk lug 334. Air 242 may enter aperture 352, whereby air 242 may enter the space defined by the forward surface of rotor disk 230 and the aft surface of cover plate 350, whereby air 242 may enter the space defined by trench 332, retainer plate 360, and cover plate 350, whereby air 242 may enter into the space between distal surface 336 and shield plate 370. Accordingly, air 242 may occupy the space between the distal surface 336 of disk lug 334 and the proximal face of shield plate 370, thereby cooling the distal surface 336 of disk lug 334. Accordingly, a flow path may be defined by the space between the forward surface of rotor disk 230 and the aft surface of cover plate 350, trench 332 and the aft surface of cover plate 350, trench 332 and the aft surface of retainer plate 360, and the distal surface 336 of disk lug 334 and the proximal surface of shield plate 370.

Air 242 may exit rotor disk assembly 200 via blade 210. For example, an aperture may be disposed near the center of shield plate 370 whereby air 242 may enter through the proximal side of shield plate 370 and exit the proximal side of shield plate 370 into a cavity within blade platform 212 and thereby into blade 210 as shown by arrow 242A. Air 242 may exit rotor disk assembly 200 via gaps between various rotor disk assembly components including shield plate 370, retainer plate 360, and rotor disk 230. For example, air 242 may exit rotor disk assembly 200 via a gap between various segments of retainer plate 360 as shown by arrow 242B.

Figure 3B:
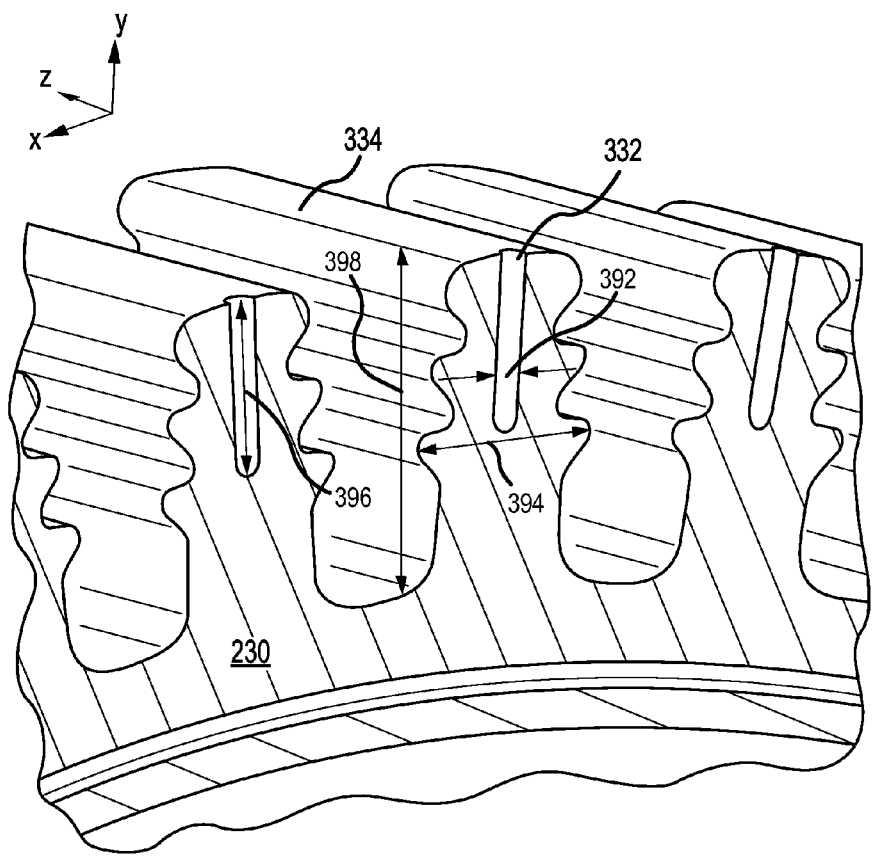
FIG. 3B illustrates a perspective view of a portion of a rotor disk with disk lug trenches, in accordance with various embodiments.

With respect to FIG. 3B, elements with like element numbering as depicted in FIGS. 2-3A are intended to be the same and will not be repeated for the sake of clarity.

With reference now to FIG. 3B, a perspective view of the forward side of rotor disk 230 is illustrated. As previously described, trench 332 may be disposed on the surface of disk lug 334. In various embodiments, the width 392 (shown along the x-direction) of trench 332 may be less than the maximum width 394 of disk lug 334. In various embodiments, the length 396 (shown along the y-direction) of trench 332 may be less than the length 398 of disk lug 334.

In various embodiments, rotor disk 230 may comprise an austenitic nickel-chromium-based alloy such as Inconel®, which is available from Special Metals Corporation of New Hartford, N.Y., USA. In various embodiments, trench 332 may be manufactured via an additive process. In various embodiments, trench 332 may be manufactured via a subtractive process. In various embodiments, trench 332 may be manufactured via a drilling or milling process. In various embodiments, trench 332 may be manufactured via an electrical discharge machining (EDM) process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A rotor disk assembly, comprising:
a rotor disk, comprising:
a disk lug fixed to a distal surface of the rotor disk; and
a trench disposed on a surface of the disk lug and extending radially inwards from a distal surface of the disk lug, wherein the trench is configured to at least partially define a flow path by which air may reach a distal surface of the disk lug;
a retainer plate, wherein the flow path is partially defined by at least a portion of an aft surface of the retainer plate;

a cover plate coupled to the rotor disk, wherein the flow path is partially defined by at least a portion of an aft surface of the cover plate;
an aperture disposed in the cover plate, wherein the flow path is partially defined by the aperture;
a blade platform coupled to the cover plate via the retainer plate; and
a shield plate coupled between the distal surface of the disk lug and a proximal surface of the blade platform, wherein the flow path is partially defined by the distal surface of the disk lug and the proximal surface of the blade platform,
wherein the retainer plate is coupled between the cover plate and the blade platform, a distal end of the retainer plate being mechanically retained from moving in a forward direction by the blade platform and a proximal end of the retainer plate being mechanically retained from moving in the forward direction by the cover plate.

2. The rotor disk assembly of claim 1, wherein the trench is located on a forward side of the rotor disk.

3. The rotor disk assembly of claim 1, wherein the disk lug is configured to couple the rotor disk to the blade platform.

4. The rotor disk assembly of claim 1, wherein the rotor disk assembly is a high pressure turbine rotor disk assembly.

5. The rotor disk assembly of claim 1, wherein the air is cooling air, wherein the flow path is configured to provide cooling to the disk lug.

6. The rotor disk assembly of claim 1, wherein a length of the trench is less than a length of the disk lug.

7. The rotor disk assembly of claim 1, wherein a width of the trench is less than a maximum width of the disk lug.

8. The rotor disk assembly of claim 1, wherein the rotor disk comprises a nickel based alloy.

9. The rotor disk assembly of claim 1, wherein the trench is manufactured via at least one of an additive process, a subtractive process, or an electrical discharge machining process.

10. A gas turbine engine, comprising:
a rotor disk assembly, comprising:
a blade platform;
a cover plate;
a retainer plate coupled between the blade platform and the cover plate; and
a rotor disk, comprising:
a disk lug fixed to a distal surface of the rotor disk; and
a trench disposed on a surface of the disk lug and extending radially inwards from a distal surface of the disk lug, wherein the trench is configured to at least partially define a flow path by which air may reach a distal surface of the disk lug;
wherein the flow path is partially defined by an aft surface of the retainer plate;
the blade platform is coupled to the rotor disk via the disk lug;
the cover plate is coupled to the rotor disk; and
a distal end of the retainer plate is mechanically retained from moving in a forward direction by the blade platform and a proximal end of the retainer plate is mechanically retained from moving in the forward direction by the cover plate.

11. The gas turbine engine of claim 10, wherein the trench is located on a forward side of the rotor disk.

* * * * *